Nov. 26, 1935.                L. C. SCHARNHORST                2,022,091
                                LEADER STRAIGHTENER
                                 Filed May 3, 1932

Inventor
L. C. Scharnhorst
by John J. Kane
   Attorney

Patented Nov. 26, 1935

2,022,091

UNITED STATES PATENT OFFICE 2,022,091

LEADER STRAIGHTENER

Louis C. Scharnhorst, Milwaukee, Wis.

Application May 3, 1932, Serial No. 608,917

12 Claims. (Cl. 140—135)

This invention relates in general to devices for use in straightening wires, gut, and the like, to relieve the same of coil formation, bends or kinks, and it has more particular relation to devices of utility in straightening gut leaders used for fishing tackle.

In the use of gut leaders, particularly those of extended length, which are ordinarily formed by tying together several sections of gut, and used ordinarily in attaching fly hooks to a line, the leaders, when not in use on the rod, have usually been coiled and, as they dried, they retained this coil formation. In order to most successfully use leaders in fly fishing, it is necessary that the leaders be straightened before casting. And particularly because of the fact that gut leaders, especially those made up of several sections tied together, are very difficult to straighten to any satisfactory degree by applying unbending or untwisting force to a coiled leader, there being great danger of breaking the leader during manipulation thereof for straightening purposes, it has been general practice among anglers to thoroughly moisten the leader in water for an extended period before using, this having the effect of removing the permanent coil set or kinks from the leader; and many anglers carry, as a part of their tackle or kit, a number of thoroughly moistened felt pads between which coiled leaders are held for several hours. Aside from the fact that this equipment requires considerable space in the kit or other paraphernalia of the angler, proper attention to these moistening pads is a decided inconvenience to the angler; and the angler's lack of foresight in not having a sufficient number of moistened and straightened leaders available, usually results in great inconvenience and regrettable delay.

In accordance with the present invention, a device is provided through the use of which dry coiled leaders or the like may be readily straightened and made thoroughly available and ready for use with great ease and no inconvenience, and in a very short time and with little likelihood of breaking the leader.

It is an object of the present invention to provide an improved device of particular utility in removing coil formation, kinks or bends from flexible wire or filaments, and especially gut leaders, such as are used for fishing tackle.

It is a further object of the present invention to provide an improved device of the above described general character which is of especial utility for straightening gut leaders and the like having one or more knots therein formed by tieing together a plurality of separate sections.

It is a further object of the present invention to provide an improved leader straightener in the form of a unitary and compact device, of simple and inexpensive design and construction, and which is durable and easily manipulated and capable of straightening leaders when in dry condition in a minimum of time and with a minimum liability of breakage of the leaders.

These and other objects and advantages are attained by the present invention, various novel features of which will be apparent from the description and accompanying drawing herein, disclosing an embodiment of the invention, and will be more particularly pointed out in the claims.

Figure 1:
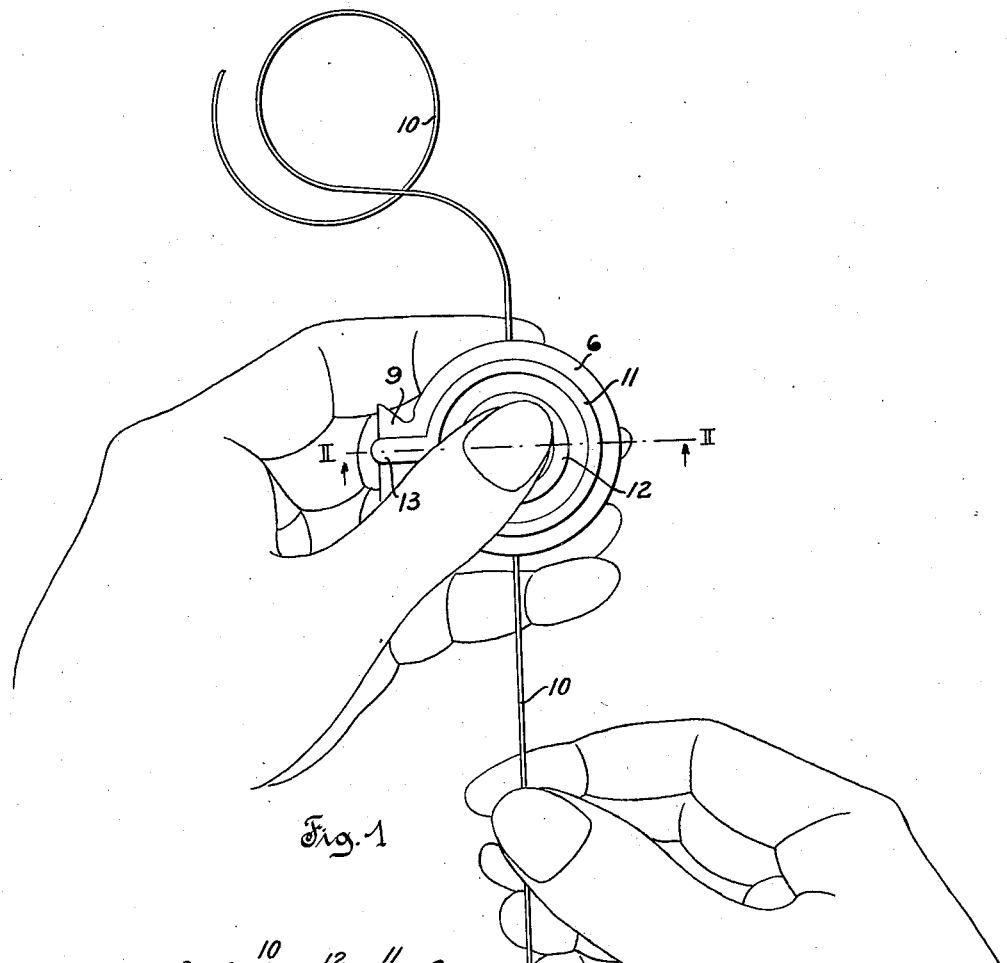
Fig. 1 is a view in elevation of a leader straightener embodying features of the present invention.
Figure 2:
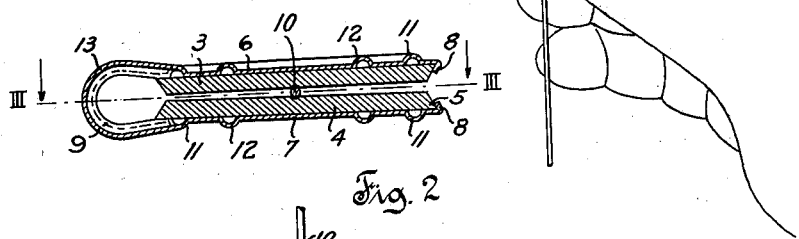
Fig. 2 is a sectional view in the plane of the line II—II of Fig. 1.
Figure 3:
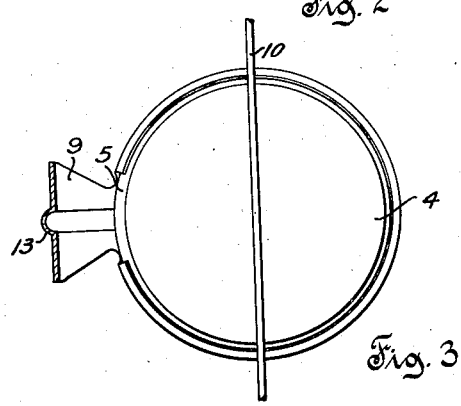
Fig. 3 is a sectional view in the plane of the line III—III of Fig. 2.

In the drawing, the present invention is shown as being embodied in a leader straightener comprising a pair of opposed pads 3, 4 of flexible and preferably resiliently yieldable material, such as relatively soft rubber, the pads being here shown as separate elements of generally disc formation and each provided with an annular outwardly flaring edge portion 5 adjacent its rear side or face. The resiliently yieldable pads 3, 4 are mounted or supported in desired opposed operative relation on a pair of disc-like supports 6, 7, respectively, each having an edge portion 8 turned in at an angle and over the flared base portion of the flexible pad 3 or 4 mounted thereon, these edge portions being forced into holding engagement with the flared edge of the base portion of the pad and securely retaining the pad in desired operative relation.

The resiliently yieldable pads 3, 4 may be held in desired operative position and relation to each other by providing the backing supports 6, 7 with a yieldable connection, indicated at 9, therebetween, this connection being preferably integral with the supports 6, 7. A convenient arrangement is one wherein the material of the backing supports 6 and 7 and the connection 9, or at least the latter, are formed of material which provides, through the connection 9, a spring or resilient connection between the supports 6, 7, the normal set of the arms of the spring connection being such as serves to normally hold the backing supports 6, 7 with their yielding pads 3, 4 at the desired distance apart to permit ready insertion therebetween of a portion of a leader or the like, 10 to be straightened. The integral securing flanges 8 are shown as omitted at the points where the parts of the connection 9 are joined to the supporting discs 6, 7.

The strength and degree of resilience of the connection 9 between the supports 6, 7 for the flexible pads are such that the supports, with their yieldable pads, may be readily forced together, through pressure exerted by a thumb on one supporting disc and one or more fingers of the same hand upon the other disc so as to cause the pads 3, 4 to forcibly, but nevertheless yieldably, grip a leader therebetween, and such that when pressure of the thumb and fingers is released, the supports and pads thereon automatically return to desired normal position.

The body portion of each of the supporting discs 6, 7 is preferably formed with one or more ribs, here shown as a plurality of annular raised ribs or projections 11, 12 which, in addition to serving to stiffen these parts, facilitate ready gripping of the discs by the thumb and fingers.

The material of the flexible connection 9 between the supporting discs is preferably made wider at its intermediate portion, thus providing required strength at the flexing portion of the joint. And a raised strengthening rib, as indicated at 13, may be formed in the joint portion 9 to provide additional stiffness of this part.

In the use of a leader straightener of the form disclosed hereinabove, the straightener may be held by the thumb and one or more fingers of the same hand, as generally indicated in Fig. 1, and the end of a leader or the like 10 to be straightened, is passed into the space between the opposed yieldable pads 3, 4, with an end of the leader extending; and pressure of the thumb and fingers is exerted on the supporting discs 6, 7 to force the yieldable pads 3, 4 toward and into forcible engagement with each other and the leader therebetween, the leader being substantially pressed into the yieldable surface of the pads. With force thus applied by the thumb and fingers, the leader is forcibly drawn or dragged between the opposed yieldable pads 3, 4, a substantial portion or degree of the coil set or kink being removed from the leader at each draft thereof across the pads 3, 4 of the straightener.

Where the device is intended primarily for use in straightening leaders and the like of small diameter, it is quite satisfactory that the normal set of resilient connection piece 9 be such that the heel portions, i. e., the portions nearest the connection piece, of the pads 3, 4 be normally in substantial engagement with each other, and the portions of the pads remote from the connection piece 9 being spaced apart sufficiently to permit ready insertion of the leader between intermediate portions of the opposed faces of the pads.

Due to the yieldable character of the pads 3, 4, any knots in the leader readily pass or are drawn between the pads without untying of the knots or breakage of the leader at the knots or other point. A relatively few passages or forcible drafts of an originally coiled leader through the straightener, in the manner described hereinabove, results in practically complete straightening of the originally coiled leader; and this operation of satisfactorily straightening, or removing the coil formation or kinks from an ordinary leader, when in wholly dry condition, can be readily accomplished in the manner described in a very short time, half a minute ordinarily being sufficient for practical purposes.

It will be apparent that there is provided in accordance with the present invention a device of great utility in straightening leaders and the like, and one which is of relatively simple design and may be placed in a fisherman's kit at a relatively small cost, and also a device which, for ordinary purposes, is of such relatively small size that it may be readily and conveniently carried in a fisherman's pocket or a small compartment of his kit.

It should be understood that it is not desired that the invention claimed be limited to the exact details of design and construction hereinabove set forth, for obvious modifications within the scope of the appended claims will be apparent to persons skilled in the art.

It is claimed and desired to secure by Letters Patent:

1. A device for straightening leaders and the like, comprising a plurality of opposed elements adapted to yieldingly grip a leader therebetween, and a yieldable connection between said elements, said elements being biased away from each other and one of said elements including an active surface portion of resiliently yieldable material.

2. A device for straightening leaders and the like, comprising a plurality of opposed elements having active surface portions of resiliently yieldable material and adapted to yieldingly grip a leader therebetween, and a yieldable connection between said elements effective to bias said elements one away from the other.

3. A device for straightening leaders and the like, comprising a pair of oppositely disposed supporting plates, a resiliently yieldable connection between said plates, and pads of resiliently yieldable material mounted on the opposed faces of said plates, said connection biasing the active portions of said pads one away from the other to a spaced apart relation.

4. A device for straightening leaders and the like, comprising a pair of oppositely disposed supporting plates, a resiliently yieldable connection between said plates serving to bias said plates one away from the other, and pads of resiliently yieldable material mounted on the opposed faces of said plates, said plates having portions thereof turned over into engagement with edge portions of said pads whereby said pads are secured in operative position on said plates.

5. A device for straightening leaders and the like, comprising a pair of oppositely disposed supporting plates, a resiliently yieldable connection between said plates, serving to bias said plates one away from the other, pads of resiliently yieldable material having shouldered edge portions and mounted on the opposed faces of said plates, and means carried by said plates and cooperative with said shouldered edge portions of said pads to secure said pads in operative position on said plates.

6. A device for straightening leaders and the like, comprising a unitary structure and having two opposed and normally spaced elements with a resiliently yieldable and integral connection therebetween biasing said elements one away from the other to spaced apart relation and permitting said elements to be forced into yielding gripping relation with a leader disposed therebetween.

7. A device for straightening leaders and the like, comprising a unitary structure formed of sheet material presenting a pair of opposed and normally spaced plate elements with a resiliently yieldable connection therebetween and a pad of resiliently yieldable material mounted on one of said plate elements on the face thereof adjacent the other of said elements, said yieldable connection serving to bias said plate elements one from another and permitting said elements to be forced into yielding gripping relation with a leader therebetween.

8. A device for straightening leaders and the like, comprising a unitary structure formed of sheet material presenting a pair of opposed and normally spaced plate elements with a resiliently yieldable connection therebetween, and pads of resiliently yieldable material mounted upon the opposed faces of said plate elements, said connection biasing said plate elements one away from the other to a position wherein portions of said pads are in spaced relation.

9. A device for straightening leaders and the like, comprising a unitary structure formed of sheet material presenting a pair of opposed and normally spaced plate elements with a resiliently yieldable connection therebetween serving to bias said elements one away from the other, and pads of resiliently yieldable material mounted upon the opposed faces of each of said plate elements, said pads having shouldered edge portions, and said plate elements having integral edge portions turned over the edge portions of said pads and effective to secure said pads in operative position.

10. A device for straightening leaders and the like, comprising a unitary structure formed of sheet material presenting two opposed and normally spaced plate elements with a resiliently yieldable connection therebetween serving to bias said elements one away from the other, said plate elements and said connection being formed with integral strengthening ribs.

11. A device for straightening leaders and the like, comprising a plurality of opposed elements, one of said elements having an active surface portion of resiliently yieldable material, and a yielding connection between said elements biasing one element away from the other and permitting said element to be forced into and to move out of yielding gripping relation with a leader disposed between said elements.

12. A device for straightening leaders and the like, comprising a pair of opposed elements adapted to be forced into yielding gripping relation with the leader disposed between said elements, and a yieldable connection between said elements serving to normally bias said elements one away from the other.

LOUIS C. SCHARNHORST.